April 2, 1929.   R. J. H. POWEL, JR   1,707,368
RANGE AND DEFLECTION SETTING MECHANISM
Filed Nov. 30, 1923    4 Sheets-Sheet 1
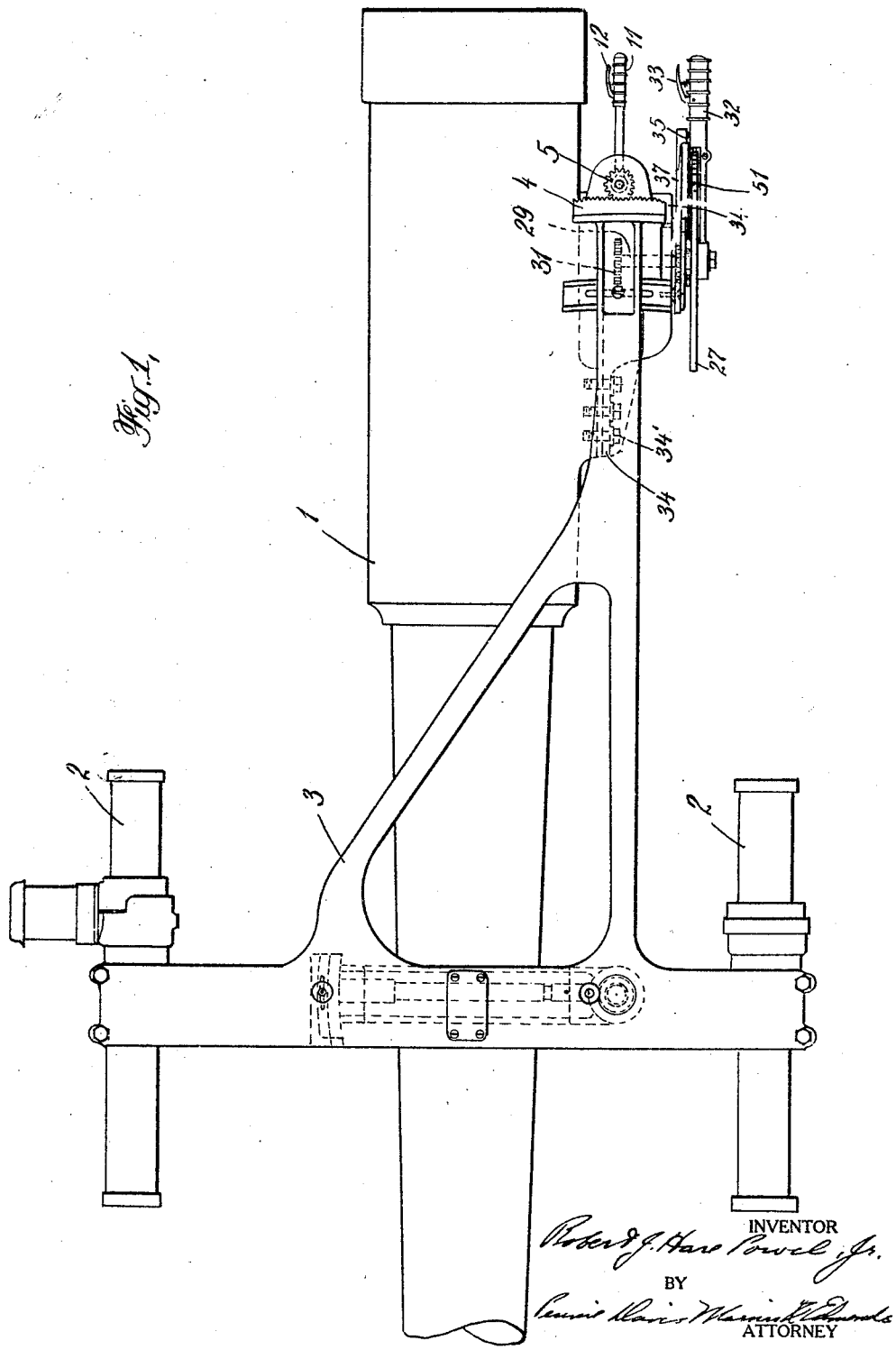

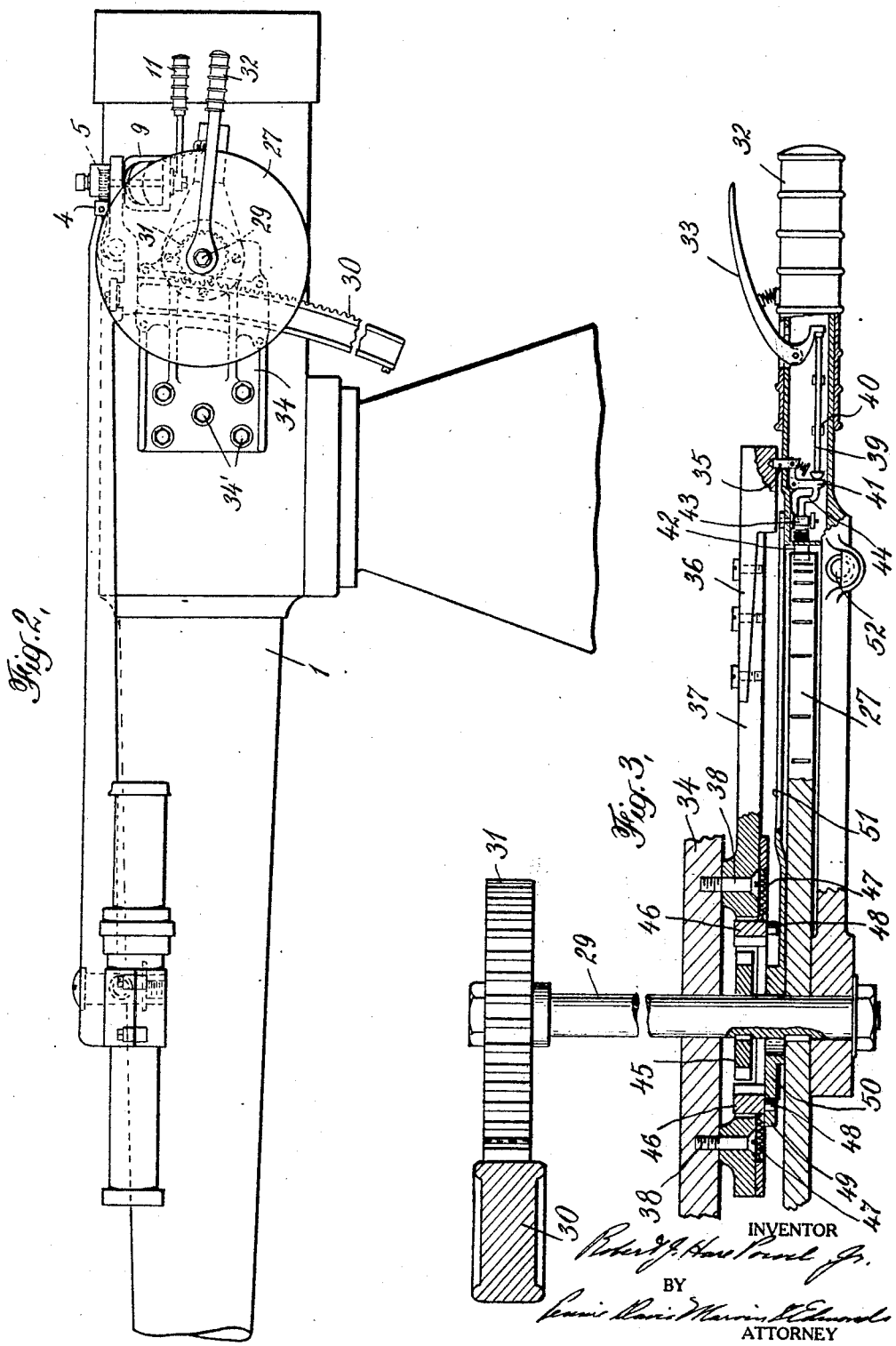

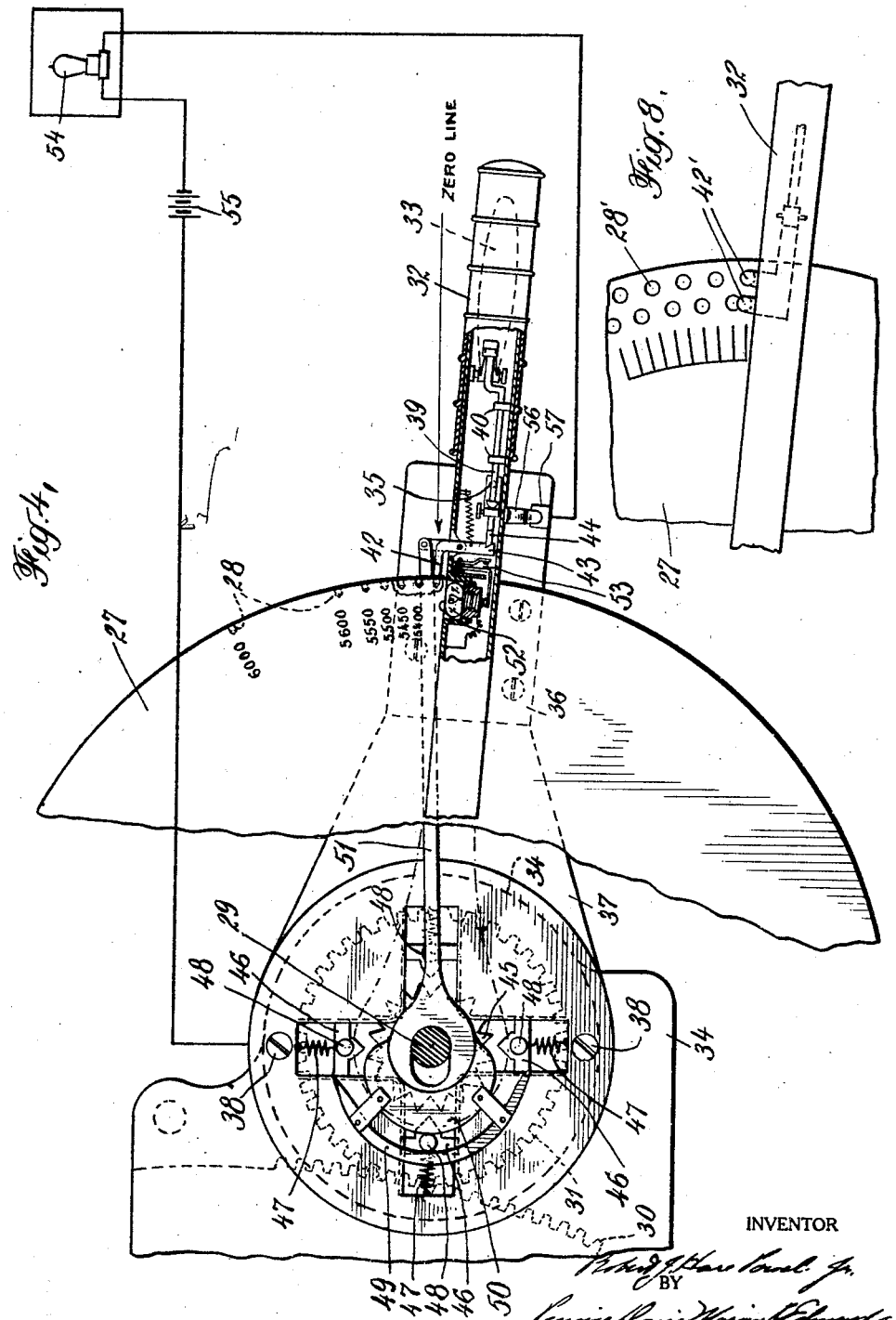

April 2, 1929. R. J. H. POWEL, JR 1,707,368
RANGE AND DEFLECTION SETTING MECHANISM
Filed Nov. 30, 1923   4 Sheets-Sheet 4
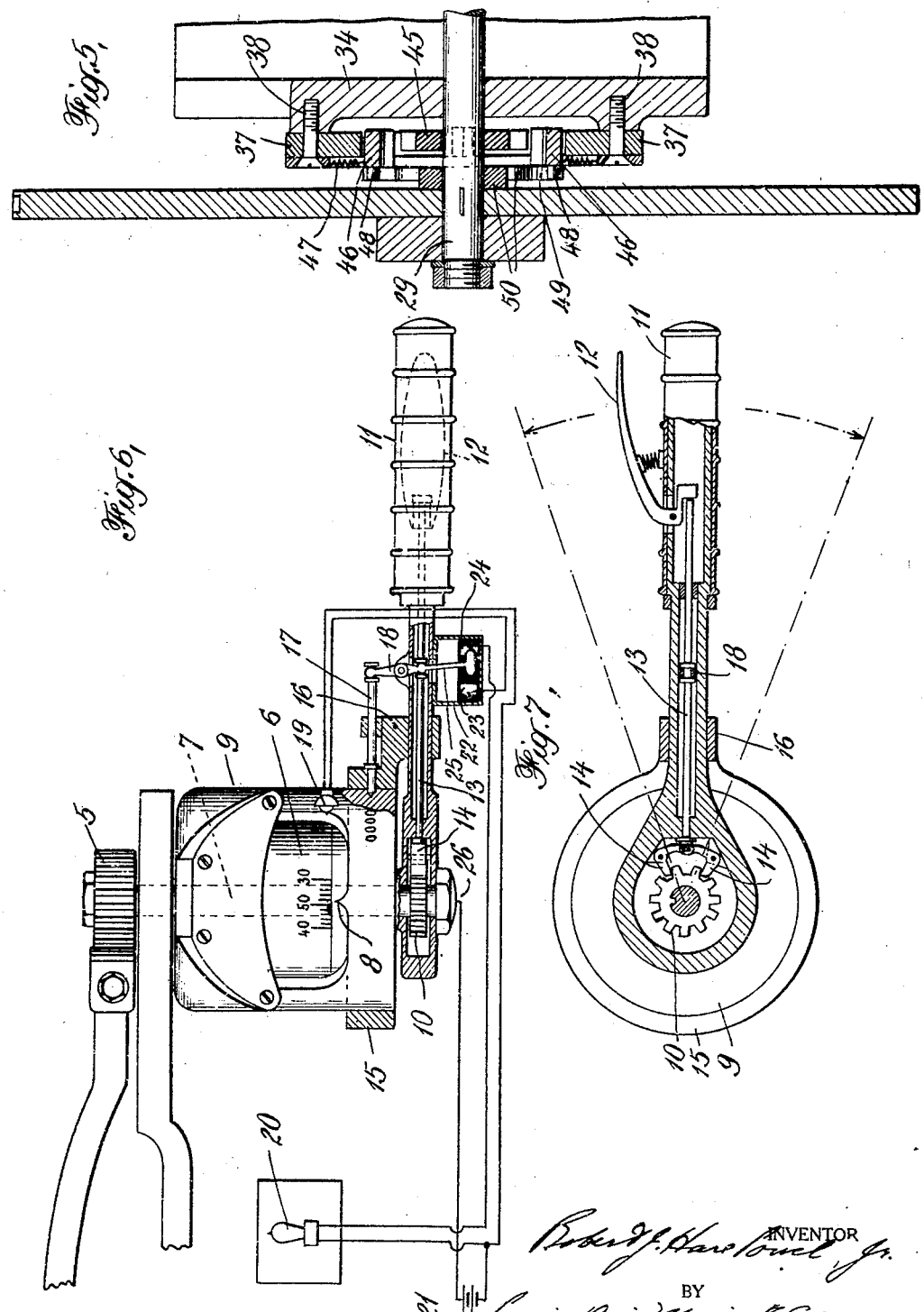

88. GEOMETRICAL INSTRUMENTS.

Patented Apr. 2, 1929.

1,707,368

UNITED STATES PATENT OFFICE.

ROBERT J. HARE POWEL, JR., OF NEW YORK, N. Y.

RANGE AND DEFLECTION SETTING MECHANISM.

Application filed November 30, 1923. Serial No. 677,758.

This invention relates to range and deflection setting mechanisms particularly adapted to be used with broadside guns. This invention was devised for the purpose of eliminating a number of undesirable features possessed by the ordinary sight-setting mechanisms now in common use, the ultimate object being to make it possible to secure unusually accurate sight settings with a minimum of effort.

The ordinary sight setting mechanism used with broadside guns includes worm-geared setting wheels associated with the range and deflection scales. In order to make a new setting, it is necessary to turn both of these setting wheels to some new positions, and experience has shown that it is very difficult to make accurate settings in the short period of time in which the settings must be made. There is always considerable lost motion in the worm-gearing, and the sight setter must take particular pains in order to stop turning the setting wheels at exactly the right instant to have the settings correct. It is almost impossible to turn the wheels to the exact points desired, the common occurrence being to either turn the wheels too far, or not quite far enough to give the required setting.

The present invention was devised with a view to avoiding the errors inherent in the worm-geared mechanism and the errors which may be charged to the human element. In general, the invention consists in the provision of levers or equivalent members on the range and deflection scales and in the provision of an enlarged range scale in the form of a disc notched or slotted on or near its edge at the various range markings. The range scale is fixed to the shaft upon the inboard end of which is mounted the gear which engages the sword bar of the sight yoke. The range lever is rotatably mounted on the outboard end of this shaft whereby it may be rotated with respect to the range scale. A range setting may be made by moving the lever around on the range scale until a pawl carried by the lever is opposite a notch corresponding with the desired setting. The pawl is then released to lock the lever and range scale together, and the lever is brought back to its initial or normal position, where it automatically locks itself, thus insuring an exact setting. Since the lever is locked to the range disc, the motion of the lever, as it is brought back to its initial position, is transmitted directly to the sword bar, which raises or lowers the sight yoke by a simple jacking movement.

One object of the invention is to provide means for holding or locking the sight yoke in position, while the range lever is being moved to a new position; and a further object is to provide means for illuminating the range and deflection scales only when new settings are being made.

The various objects and advantages of my invention may be best understood by considering the following detailed description, which is to be taken in conjunction with the accompanying drawings, in which—

Fig. 1 is a plan view of a gun and sight yoke, provided with my improved range and deflection setting mechanisms.

Fig. 2 is an elevation of the gun and associated parts shown in Fig. 1.

Fig. 3 is a longitudinal section view of part of the improved range setting mechanism.

Fig. 4 is a fragmentary elevation, partly in section, of the improved range setting mechanism.

Fig. 5 is a vertical section view of part of the range setting mechanism.

Fig. 6 is an elevation of the improved deflection setting mechanism.

Fig. 7 is a longitudinal section view of the deflection setting mechanism, and

Fig. 8 is a detail view of a modification.

Fig. 1 shows a gun 1 of ordinary construction provided with sights 2 carried by a sight yoke 3 which is pivoted on the gun so that it may swing about a vertical axis and so that it may be oscillated about a horizontal axis. The after end of the sight yoke is provided with an arcuate rack 4 cooperating with a pinion 5 so that the sight yoke may be oscillated about its vertical axis in making deflection settings.

The deflection setting mechanism, best shown in Figs. 6 and 7, comprises a drum 6 mounted on the shaft 7 which carries the pinion 5. The drum 6 is provided with a deflection scale cooperating with a reference point or index 8 fixed to the casing 9 which encloses the drum. The lower end of the shaft 7 carries a gear 10 which may be turned by means of a hand lever 11 provided with a spring catch 12. The lever 11 is hollow and encloses a shaft 13 which engages two dogs 14, cooperating with the gear 10. When the spring catch 12 is pressed against the handle 11, the dogs 14 are disengaged from the gear 10. The handle 11 may then be moved to a new position, the catch 12 partially released until the dogs 14 engage the pinion 10, and then the handle may be brought back to its initial position or to any other desired position, the object being to rotate the drum 6 until a certain point on the scale is opposite the pointer 8. In other words, the lever 11, with its associated parts, serves as a convenient means for jacking the gear 10 around, whereby the deflection settings may be readily made.

It is desirable to provide some means for locking the deflection lever in any position in which it may be placed. The particular locking means illustrated in Fig. 6 consists of a collar 15 which encircles the lower end of the drum casing 9, and which is provided with a short lateral extension 16 which encircles the lever 11. The lower end of the casing 9 is provided with a plurality of holes adapted to cooperate with a locking pin 17. This pin is carried by the collar 15 and the projection 16 thereon, the pin being adapted to be moved by a short lever 18, pivoted on the hand lever 11. The shaft 13 within the hand lever 11 engages the lower end of the lever 18, these parts being arranged so that when the spring catch 12 is pressed against the handle 11, the shaft 13 is pushed forward and the pin 17 is withdrawn from the casing 9. At the same time the dogs 14 are also disengaged from the pinion 10. The hand lever may then be moved to a new position. The lever 18 is so proportioned that an initial movement of the spring catch 12 toward the hand lever 11 causes the pin 17 to be withdrawn from the notches in the casing 9 without releasing the dogs 14 from the pinion 10. The disengagement of the dogs 14 from the pinion 10 is caused by a further movement of the spring catch 12 toward the hand lever 11. When it is desired to make a new setting the spring catch 12 is depressed to disengage both the locking pin 17 and the dogs 14. The lever may then be moved to a new position and the spring catch 12 released sufficiently to cause the dogs 14 to engage the pinion without the locking pin 17 engaging the notches in the casing 9. With the parts in this position, the hand lever 11 is turned until the desired setting is obtained and the spring catch 12 then further released to cause the locking pin 17 to enter one of the notches in the casing 9 and thereby hold the parts in the new position.

In order to illuminate the deflection scale on the drum 6 when it is desired to make a new deflection setting, I have provided a lamp 19 mounted on the casing 9. This lamp is controlled by the spring catch 12 in such a manner that it is lighted only when a new setting is to be made. I also provide a signal lamp 20, which is lighted after a new setting has been made. The electric current supplied to the lamps 19 and 20 from any convenient source, such as the battery 21, is controlled by means of a selector switch mounted on the hand lever 11. This switch comprises a contact box 22 fixed to the lever 11 and carrying contacts 23 and 24 insulated from the box. As shown in the drawings, an extension of the lever 18 forms the movable contact 25 which cooperates with the stationary contacts 23 and 24 to light either of the lamps 19 and 20. One terminal of the battery 21, or its equivalent, is connected to the framework of the deflection setting mechanism in any convenient manner. In the drawing I have shown one terminal of the battery 21 connected to the end of shaft 7 at 26. The other terminal of the battery is connected to the lamps 19 and 20 which are in turn connected to the contacts 23 and 24, respectively.

Figure 6 shows the relative positions of the several parts when a setting has been made. The locking pin 17 projects into the casing 9 so as to lock the lever 11 in its adjusted position; and it will be noted that the contact lever 25 engages the contact 24, thus completing the circuit through the signal lamp 20 so as to indicate the fact that the setting has been made. When a new setting is to be made, the spring catch 12 is pressed against the handle 11, so that the lever may be moved to a new position with respect to the drum 6. When the catch 12 is pressed against the lever 11, the contact lever 25 moves away from contact 24 and into engagement with contact 23. The lamp 20 is therefore no longer lighted, but the lamp 19 is lighted for the circuit including this lamp is closed through contacts 23 and 25. This lamp 19 remains lighted as long as the spring catch 12 is pressed against the lever 11, or in other words, until a new setting has been made. After the setting has been made, the spring catch 12 is of course released and the contact lever 25 returns to the position shown in Fig. 6.

By referring to Figs. 1, 2 and 3, it will be noted that the sight yoke 3 is provided with the usual vertically arranged sword bar 30, adapted to cooperate with a pinion 31 by means of which the sight yoke may be raised and lowered as desired in making range settings. The pinion 31 is fixed to a shaft 29, which may be rotated by the range setting mechanism hereinafter described.

In the improved range setting mechanism I employ a range disc 27 of relatively large diameter, fixed to the shaft 29 and having a plurality of slots or equivalent depressions 28 on or near the edge of the disc. These depressions are spaced to correspond with a range scale which may be laid off near the edge of the disc. In Fig. 4 the slots 28 are shown on the edge of the disc 27, while in the modifications illustrated in Fig. 8, the slots are shown in the form of cylindrical depressions 28' on the face of the disc near the edge thereof, these depressions being arranged in two concentric rows. The latter form may be preferable to that shown in Fig. 4, where a range disc of small diameter is to be used or where it is desirable to space the depressions very close together on a disc of large diameter.

In order to make a given range setting, it is necessary to turn the disc 27 to a particular position corresponding with this setting. Instead of using the common worm-geared setting machanism, which possesses a number of disadvantages as set forth above, I prefer to use a hand lever 32 or equivalent member, rotatably mounted on the shaft 29 and arranged so that the lever may be fixed to the disc 27 and then moved to a certain rest position so as to effect an exact range setting.

Figs. 3 and 4 show the hand lever 32 in its rest position. When the lever is in this position, it is locked to a plate 34 fixed to the gun by means of bolts 34'. The lever 32 is locked in its rest position by means of a spring pressed locking pin 35, which engages a notch in a metal plate 36. This plate 36 is fixed to a second plate 37 which is in turn fixed to the member 34 by means of machine screws 38. When the lever 32 is moved to its rest position, the pin 35 springs into the slot in the plate 36 and locks the lever in this position. When a new setting is to be made, the spring catch 33 is pressed against the lever 32, thus causing the rod 39 supported in suitable guide bearings 40 within the hand lever 32 to move forward and actuate the angle lever 41 which is connected to the pin 35. The resulting movement of the lever 41 withdraws this pin 35 from the slot in the plate 36; and when the locking pin 35 is thus withdrawn, the hand lever 32 may be moved to a new position with respect to the disc 27. When the lever has been moved until the lug 42 carried thereby is opposite the slot in the range disc 27, corresponding with the new range setting, the spring catch 33 is released. This causes the lug 42 to enter the slot 28 opposite thereto, thus locking the disc 27 and hand lever 32 together. It will be noted that the lug 42 comprises a projection on a small lever 43 pivoted to the hand lever 32. The lever 43 is adapted to be actuated by means of a projection 44 forming part of the angle lever 41. After the spring catch 33 has been released and the hand lever 32 locked to the disc 27, the lever 32 is moved by hand to its rest position where it is automatically locked to the stationary member 34 by the locking pin 35.

The range setting machanism just described serves as an efficient means for making exact range settings. After the lug 42 has been inserted in the proper slot in the disc 27, the hand lever 32 is brought to rest at its neutral position and locked in this exact position by the locking pin 35. The lug 42 is then in alignment with the zero line (see Fig. 4) of the setting mechanism and the possibility of having the range disc slightly out of position is thus completely avoided.

The operation of the range setting mechanism may be termed a "jacking" operation for the hand lever 32, which is loosely mounted on the shaft 29, is in fact used as a means for jacking the disc 27 around to any desired position. Since this disc is fixed to the shaft 29, the jacking operation serves to rotate the pinion 31 and thus raise or lower the sword bar 30 in the well-known manner.

In constructing a sight yoke such as that shown in the accompanying drawings, an attempt is made to balance the yoke so that it is in substantially neutral equilibrium in all positions. As a practical matter, it is impossible to construct a sight yoke and the parts carried thereby in such a manner that the yoke is in neutral equilibrium in all positions. It is therefore apparent that if the afterend of the sight yoke is heavy enough to overcome the friction between the sword bar 30 and the pinion 31, and the friction of the bearing for the shaft 29, the afterend of the sight yoke will drop every time the locking pin 35 and the lug 42 are withdrawn from their respective sockets.

In order to prevent the sight yoke from dropping in the manner above described, it is desirable to provide some means for automatically locking the sight yoke whenever the locking pin 35 and the lug 42 are withdrawn from their respective sockets, and thus avoid the necessity for manually holding the sight yoke in position while a new setting is being made. In the accompanying drawings I have illustrated such a locking device which is controlled by the operation of the spring catch 33 carried by the hand lever 32. This locking means serves to lock the shaft 29 to the stationary member 34 whenever the locking pin 35 and lug 42 are withdrawn from their respective grooves or sockets.

The locking device referred to in the preceding paragraph comprises a toothed wheel 45 keyed to the shaft 29 and adapted to cooperate with a plurality of slidably mounted detents or lugs 46. In the particular embodiment illustrated in the accompanying drawings I have provided four detents 46 spaced at equal intervals around the shaft 29. Each of these lugs or detents 46 is loosely mounted within guides formed in the stationary plate 37, and each detent is held in its outermost position by means of a spring 47. Each detent is provided with a laterally projecting lug 48, adapted to be engaged by an arcuate member 49, carried by a plate 50 which encircles the shaft 29. This plate 50 is provided with a slot which permits lateral movement of the plate with respect to the shaft 29. A rod 51 connects the plate 50 with the lever 43 pivoted to the hand lever 32.

The operation of the locking device described in the preceding paragraph may be described as follows. When the spring catch 33 is pressed against the lever 32, the small lever 43 is actuated so as to remove the lug 42 from one of the slots in the disc 27 and also to move the outer end of the rod 51 outward, away from the disc 27. This movement of the rod 51 produces a lateral movement of the plate 50 with respect to the shaft 29, thus causing the arcuate member 49 to force one of the detents 46 into engagement with the toothed wheel 45, thus locking the toothed wheel to the stationary plate 37. The hand lever 32 may then be moved around to any desired position with respect to the disc 27, which is securely locked in position by the toothed wheel 45 and one of the detents 46. If the lever 32 is moved far enough, the arcuate member 49 will engage a second detent 46 and cause it to engage the tooth wheel 45. The ends of the arcuate member 49 are tapered so that this action can take place, and this member is constructed so that it always engages at least one of the detents 46. Thus, regardless of how far the hand lever 32 is rotated with respect to the disc 27, there is always at least one of the detents 46 in contact with the toothed wheel 45. When the spring catch 33 is released so as to lock the hand lever 32 to the disc 27 by virtue of the lug 42 entering a slot in the disc, the rod 51 is of course returned to its initial position, thus releasing the pins 46 which spring back to their normal positions and leave the shaft 29 free to rotate when the hand lever 32 is moved to its rest position.

A small lamp 52 is provided for the purpose of illuminating the range disc 27 whenever it is necessary to make a new range setting. This lamp is lighted only when it is necessary to see the range scale; the supply of electric current to the lamp being controlled by the operation of the spring catch 33. When this catch 33 is pressed against the lever 32, the small lever 43 is moved forward as described above. This lever 43 is arranged so that it closes a spring contact 53, which completes the eletric circuit through the lamp 52. This spring contact 53 automatically opens when the spring catch 53 is released.

A signal lamp 54 is provided for the purpose of indicating the fact that a new setting has been made. This lamp is supplied with electric current from any convenient source such as the battery 55; and the circuit controlling the supply of current to the lamp 54 is closed by means of the contact 56 carried by the hand lever 32, engaging a stationary contact 57 mounted on the fixed plate 36. These contacts are in engagement only when the lever 32 is in its rest position. One terminal of the battery 55 is connected to the hand lever 32 in any convenient manner such as through the mechanism encircling the shaft 29; and the lamp 54 is interposed between the other terminal of the battery and the stationary contact 57.

Where the embodiment of the invention illustrated in Fig. 8 is employed, it is necessary to provide two lugs 42', one for each row of circular depressions 28' in the disc 27. The lugs 42' may be actuated by means of a small lever pivoted to the hand lever 32 in a manner similar to that shown in Fig. 4; and these lugs should of course be arranged so that at least one of them will engage a depression in the disc 27 when the spring catch 33 is released.

This invention offers a distinct improvement in sight setting mechanisms, for it makes it possible to secure exact range and deflection settings by means of apparatus which is very easy to operate. It is not necessary to watch the deflection and range scales carefully when the levers are being moved to their final positions, for they are automatically brought to rest at exactly the proper points. Furthermore, there can be no error such as that inherent in the worm-geared sight setting mechanism commonly employed, for precise positive action takes place between the various moving parts of the improved mechanism.

The present invention not only provides simple lever arrangements by which it is possible to make accurate range and deflection settings in a very efficient manner, but it also provides means for locking the range and deflection setting mechanisms in their adjusted positions, and also means for locking the sight yoke in position while the range setting is being made. This invention provides means for illuminating the range and deflection scales when it is desirable to illuminate these scales, and also means for indicating in a positive manner the fact that the range and deflection settings have been made. Another valuable feature of this invention consists in the simple construction of the various parts whereby the range and deflection setting mechanisms may be applied to ordinary sight yokes without altering the sight yoke construction in any way. The various parts can be readily mounted on the shafts commonly provided for the purpose of rotating the pinions engaging the vertical sword bar, and the horizontal arcuate rack, by means of which the sight yoke can be raised, lowered and moved sideways as desired.

It is to be understood that this invention is not limited to the particular embodiments illustrated and described, but includes such modifications thereof as fall within the scope of the appended claims. For instance, while I prefer to use the locking devices illustrated in the accompanying drawings, yet this invention may be employed to good advantage when any other equivalent locking mechanisms are employed. In some instances it might not be necessary to provide means for locking the range disc when new range settings are being made, and in this case the range disc locking mechanism may be omitted. Likewise other parts of the preferred embodiment of the invention may be omitted or altered without departing from the principle of the invention.

I claim:

1. A sight setting mechanism comprising the combination of a sight yoke, means for changing the position of said yoke, a graduated member connected to said means, a hand operable device for actuating said means, means for detachably locking said device with respect to said graduated member, and means actuated by the actuation of the means for detachably locking the hand operable device for unlocking the same.

2. A sight setting mechanism comprising the combination of a sight yoke, means for changing the position of said yoke, a graduated member connected to said means, a casing for said graduated member, a hand operable device, means for detachably connecting said device to said graduated member, and means actuated upon the actuation of the means for detachably connecting the hand operable device for unlocking the same from said casing.

3. A sight setting mechanism comprising the combination of a sight yoke, means for changing the position of said yoke, a graduated member connected to said means, a hand lever, means detachably connecting the hand lever to said graduated member, a spring catch carried by said hand lever, and means actuated by said spring catch for disconnecting said lever from said graduated member upon actuation of the means for connecting the hand lever to the graduated member.

4. A sight-setting mechanism comprising the combination of a sight-yoke, means for changing the position of said yoke, a graduated member connected to said means, a hand operable device, a member having projections thereon fixed with respect to said graduated member, and means detachably connecting the member having the projections thereon to the hand operable device whereby said last-mentioned member may be jacked around to change the position of said yoke.

5. A sight-setting mechanism of the type described, comprising the combination of a sight yoke and a shaft geared thereto, of a graduated disk fixed to said shaft, a member rotatably mounted on said shaft, hand operable means for attaching said member to said disk, means for locking said disk when said member is detached from said disk, and means carried by said member for simultaneously actuating said locking means and for rendering said attaching means inoperative.

6. A sight-setting mechanism of the type described, comprising the combination with a sight yoke and a shaft geared thereto, of a graduated disk fixed to said shaft, a hand lever rotatably mounted on said shaft, hand operable means for attaching said lever to said disk, a toothed wheel fixed to said shaft, means for locking said wheel when said lever is detached from said disk, and means carried by said lever for simultaneously actuating said locking means and for rendering said attaching means inoperative.

7. A sight setting mechanism comprising the combination of a sight yoke, means for changing the position of said yoke, a graduated member connected to said means, a casing for said graduated member, a hand lever, means detachably connecting said lever to said graduatued member, a collar carried by said lever and encircling said casing, a locking pin carried by said collar, and means carried by said lever for actuating said pin.

8. A sight setting mechanism comprising the combination of a sight yoke, means, including a shaft, for changing the position of said yoke, a graduated member and a gear fixed to said shaft, a hand lever rotatably mounted on said shaft and detachably locked to said gear, a spring catch carried by said lever, and means operated by said spring catch for unlocking said lever from said gear.

9. A sight setting mechanism comprising the combination of a sight yoke, means for changing the position of said yoke, a graduated member connected to said means, a hand lever, means for detachably connecting said lever to said graduated member, a spring catch on said lever, an electric lamp for illuminating said graduated member, and means controlled by said spring catch for lighting said lamp when said lever is detached from said graduated member.

10. A sight setting mechanism comprising the combination of a sight yoke, means for changing the position of said yoke, a graduated member connected to said means, a hand lever, means for detachably connecting said lever to said graduated member, a spring catch on said lever, an electric signal lamp, and means controlled by said spring catch for lighting said lamp when said lever is fixed with respect to said graduated member.

11. A sight setting mechanism comprising the combination of a sight yoke, means for changing the position of said yoke, a graduated member connected to said means, a hand operable device, means for detachably connecting said lever to said graduated member, an electric lamp for illuminating said graduated member, a signal lamp, and a switch controlled by said hand operable device, and arranged so that it automatically lights said signal lamp when said device is attached to said graduated member, and automatically lights said first-named lamp when said device is detached from said graduated member.

12. A sight setting mechanism of the type described, comprising the combination with a sight yoke and a shaft geared thereto, of a graduated disc fixed to said shaft and movable therewith, an adjusting member rotatably mounted on said shaft, and means for attaching said member to said disc.

13. A sight setting mechanism of the type described, comprising the combination with a sight yoke and a shaft geared thereto, of a graduated disc fixed to said shaft and provided with a plurality of depressions arranged to correspond with the graduations thereon, an adjusting member rotatably mounted on said shaft, and a lug movably mounted on said member and adapted to be moved into any one of the depressions in said disc to lock said member to said disc.

14. A sight setting mechanism of the type described, comprising the combination with a sight yoke and a shaft geared thereto, of a graduated disc fixed to said shaft and provided with a plurality of depressions arranged to correspond with the graduations thereon, a hand lever rotatably mounted on said shaft, a lug pivoted to said hand lever and arranged so that it normally projects into a depression in said disc, and a spring catch on said hand lever for withdrawing said lug from said disc.

15. A sight setting mechanism of the type described, comprising the combination with a sight yoke and a shaft geared thereto, of a device supporting said mechanism, a graduated disc fixed to said shaft, an adjusting member rotatably mounted on said shaft, means for attaching said member to said disc and means for locking said member in a certain position with respect to the device on which the sight-setting mechanism is mounted after said member has been attached to said disc.

16. A sight setting mechanism of the type described, comprising the combination with a sight yoke and a shaft geared thereto, of a graduated disc fixed to said shaft, an adjusting member rotatably mounted on said shaft, means for attaching said member to said disc, and means for automatically locking said member in a certain position with respect to the device on which the sight-setting mechanism is mounted after said member has been attached to said disc and moved to said position comprising a detent actuated by the means for attaching the member to the disk.

17. A sight setting mechanism of the type described, comprising the combination with a sight yoke and a shaft geared thereto, of a a graduated disc fixed to said shaft, an adjusting member rotatably mounted on said shaft, means for attaching said member to said disc, a signal lamp, means for automatically locking said member in a certain position after said member has been attached to said disc and moved to said position, and means adapted to light said lamp when said member is moved to said position.

18. A sight setting mechanism of the type described, comprising the combination with a sight yoke and a shaft geared thereto, of a device supporting said mechanism, a graduated disc fixed to said shaft, an adjusting member rotatably mounted on said shaft, and means for locking said disc with respect to the device on which the sight-setting mechanism is mounted when said member is detached from said disc.

19. A sight setting mechanism of the type described comprising the combination with a sight yoke and a shaft geared thereto of a graduated disc fixed to said shaft, a hand lever rotatably mounted on said shaft, means carried by said lever, arranged so that it normally connects said lever to said disc, a toothed wheel fixed to said shaft, a fixed support, a plurality of detents slidably mounted on said support, and hand operable means for simultaneously disconnecting said lever and said disc, and moving at least one of said detents into engagement with said toothed wheel.

In testimony whereof I affix my signature.

ROBERT J. HARE POWEL, Jr.